3,396,299
MAGNETIC FLUX LEAKAGE GUIDE FOR
MAGNETIC ELECTRON LENSES
Takashi Yanaka, Tokyo, Japan, assignor to Nihon Denshi
Kabushiki Kaisha, Tokyo, Japan
Filed May 25, 1965, Ser. No. 458,664
Claims priority, application Japan, June 15, 1964,
39/34,229; July 4, 1964, 39/38,431
7 Claims. (Cl. 313—84)

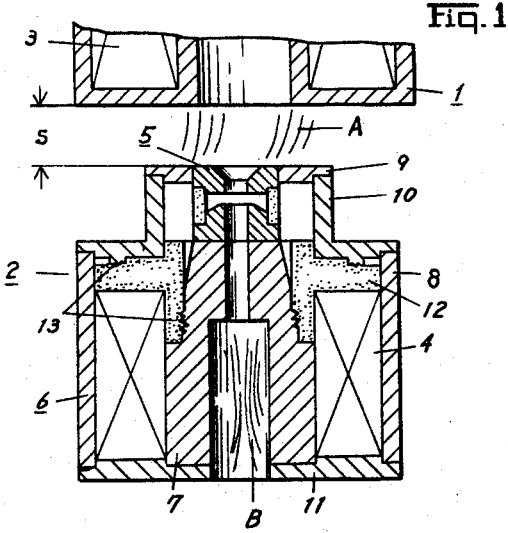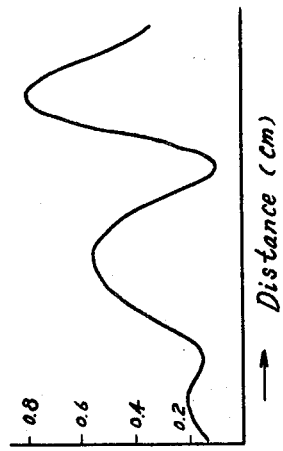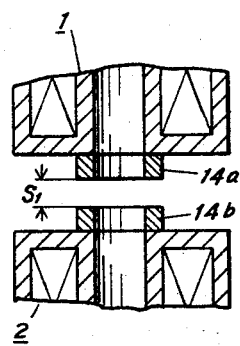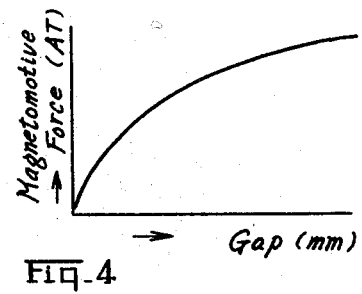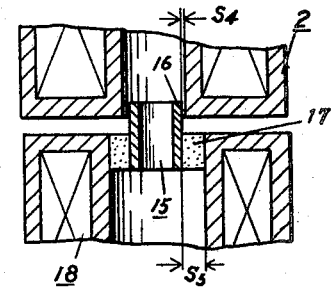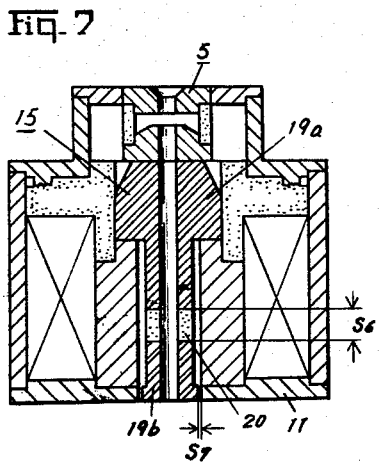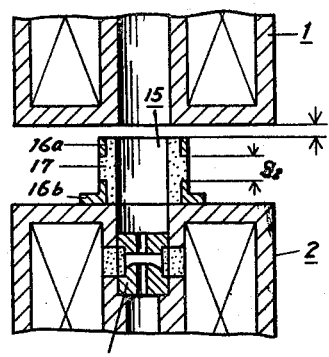
INVENTOR.
TAKASHI YANAKA
BY
Webb, Burden, Robinson & Webb United States Patent Office
3,396,299
Patented Aug. 6, 1968

ABSTRACT OF THE DISCLOSURE

A magnetic flux leakage guide for aligning asymmetrical magnetic leakage flux created in a gap between two lenses or within electron lenses themselves, said leakage flux guide comprising a magnetic element and a nonmagnetic member creating a gap between the magnetic element and the lens.

---

This invention relates to a method and apparatus for protecting the path of an electron beam from the adverse influence of stray magnetic fields such as occur in magnetic lenses.

Magnetic lenses are ordinarily employed as the lenses in electron microscopes and similar devices. Magnetic flux leakage occurs between these lenses, e.g., between an objective lens and an intermediate lens and also within a yoke of a lens. This magnetic flux leakage has a disturbing effect on the path of an electron beam passing through the microscope because it is difficult to accurately align the lens axes along the path of the optical axis when an asymmetrically distributed magnetic field occurs between these members. Additional asymmetrical magnetic disturbances exist in the interior of the yoke of a lens and are caused by the lack of magnetic uniformity of the material forming yokes of the lenses.

It is common practice to shift and tilt the lenses with respect to the optical axis so as to conform the beam axis with the optical axis for the purpose of eliminating the influence of magnetic flux leakage. However, this means of overcoming the influences of stray magnetic fields is unsatisfactory because such axis alignment requires adjustment in the order of microns and such an adjustment must be made each time there is a change in the power supplied to excite the lenses.

The present invention overcomes these difficulties by means of elements which protect the electron beam from the undesirable effects of magnetic flux leakage.

A preferred embodiment of my invention is shown in the accompanying drawings in which:

FIGURE 1 is a partial vertical section through two lenses of an electron microscope illustrating the distribution of magnetic flux leakage;

FIGURE 2 is a graph showing the distribution of magnetic flux leakage illustrated in FIGURE 1;

FIGURE 3 is a partial vertical section between two lenses of an electron microscope illustrating the principles of my invention;

FIGURE 4 is a graph showing the relationship between magnetomotive force generated by magnetic flux leakage and the width of the gap $S_1$ shown in FIGURE 3;

FIGURE 5 is a partial vertical section of two lenses of an electron microscope embodying my invention;

FIGURE 6 is a partial sectional view of two lenses of an electron microscope in which a modified form of my invention is used; and FIGURE 7 is a vertical section of an electron microscope lens embodying another form of my invention.

FIGURE 1 shows two lenses of an electron microscope, an objective lens 1 and an intermediate lens 2, having exciting coils 3 and 4 respectively. The intermediate lens 2 has a pole piece 5 and a five-part yoke 6, which parts comprise an inner yoke 7, an outer yoke 8, an upper yoke 9, a side yoke 10 and a lower yoke 11. The several parts are held together by a spacer 12 of nonmagnetic material which, as shown in FIGURE 1, is threaded to the inner yoke 7 and the side yoke 10, as shown at 13 in FIGURE 1.

Lines marked A and B in FIGURE 1 show the flux leakages which occur in the gap S between the objective lens 1 and the intermediate lens 2 and the flux leakages which occur within the inner yoke 7. These magnetic flux leakages disturb the electron beam passing through the two lenses. The flux leakage A is caused by the fact that it is very difficult to align mechanically the axes of the two lenses with the optical axis of the microscope so that the magnetic field distribution of the magnetic flux leakage is symmetrical with respect to the optical axis.

The magnetic flux leakage B is created by lack of magnetic uniformity of the material forming the yoke 7 of the lens. This yoke is usually made of such high permeability material that the value of the permeability of the yoke is changed by mechanical and thermal stress developed in it when it is being assembled to the other parts of the lens, for example, when it is soldered to other parts of the lens body or when it is threaded to the spacer 12. The stresses set up an asymmetrical magnetic flux leakage which deflects the electron beam passing through the yoke.

FIGURE 2 shows the distributions of the asymmetrical magnetic flux leakages illustrated at A and B in FIGURE 1. In this graph, the ordinate indicates the distance in centimeters between the lenses and the abscissa shows the distribution of the magnetic flux leakage.

FIGURE 3 shows apparatus on which I conducted experiments which led to my invention. Two hollow cylinders 14a and 14b made of material having high magnetic permeability, such as pure iron, are mounted on the lenses, the cylinder 14a being mounted under the objective lens 1 and the cylinder 14b being mounted on the intermediate lens 2 leaving a gap $S_1$ between their opposing faces. Using apparatus such as shown in FIGURE 3, I discovered that when the lenses are excited, the magnetomotive force induced by magnetic flux leakage increases as the gap $S_1$ becomes greater. FIGURE 4 shows the relationship between the magnetomotive force (AT) and the width in millimeters of the gap $S_1$. I also discovered that the degree of deflection of the electron beam passing through the lenses is substantially proportional to the magnetomotive force.

On the basis of these discoveries, I have devised means for preventing the effects on an electron beam of asymmetrical magnetic flux leakage, which means are shown in FIGURES 5, 6 and 7.

Referring to FIGURE 5, an electron beam passing through the objective lens 1 and the intermediate lens 2 is protected from the undesirable effects of magnetic flux leakage by a magnetic flux guide placed between the two lenses. The guide 15 comprises two hollow cylinders 16a and 16b made of material of high magnetic permeability held in axial alignment with each other but spaced from each other by a sleeve 17 of nonmagnetic material.

The guide 15 is placed on the intermediate lens 2 so that the axis of the lens and axis of the guide are in alignment and the cylinder 16a acts magnetically as an extension of the yoke of intermediate lens 2. In this arrangement, there is a gap $S_2$ between the cylinders 16a and 16b and a gap $S_3$ between the upper surface of the guide 15 and the lower surface of the objective lens 1. As shown in FIGURE 5, the gap $S_3$ is considerably smaller than gap $S_2$. However, the magnetic field in gap $S_2$ is symmetrically distributed with respect to the lens axis because intermediate lens 2 and the magnetic flux guide 15 are in alignment and the cylinders 16a and 16b are so constructed that they are symmetrical about the axis of guide 15. The magnetic field in the gap $S_3$ is asymmetrical because the axis of intermediate lens 2 (and therefore the axis of the guide 15) are not always in alignment with the axis of objective lens 1. However, the magnetomotive force induced by the magnetic flux leakage in gap $S_3$ is weak because this gap is small as compared to the gap normally encountered, and as demonstrated in FIGURE 4, the strength of the magnetomotive force is proportional to the width of the gap. Since the magnetic flux leakage at gap $S_2$ is symmetrically distributed in respect to the axis of intermediate lens 2, and therefore has no undesirable effect on the electron beam passing through the lens, the beam is affected only by the weak and relatively insignificantly asymmetric field created at gap $S_3$.

FIGURE 6 shows a magnetic flux guide which may be used when the distance between two lenses is too small to provide room for the magnetic flux guide shown in FIGURE 5. For example, the flux guide in FIGURE 6 can be used in the space between the lower surface of an intermediate lens yoke and the upper surface of a projector lens yoke. The magnetic flux guide shown in FIGURE 6 comprises a hollow cylinder 16 of material having high magnetic permeability which is positioned within the hollow center of projector lens yoke 18 by a shorter cylinder 17 made of non-magnetic material. The axis of the cylinder 16 is in alignment with the axis of the lens yoke 18. As shown in FIGURE 6, the outer end of the cylinder 16 projects into the aperture of the yoke of intermediate lens 2. In the arrangement shown in FIGURE 6, two magnetic gaps $S_4$ and $S_5$ are created, gap $S_4$ being between the outer surface of the cylinder 16 and the wall of the aperture in the yoke of intermediate lens 2, and gap $S_5$ being between the lower end of cylinder 16 and the inner wall of the aperture in the yoke 18 of the projector lens. Since the diameter of the aperture in the yoke of lens 2 is smaller than the diameter of the aperture of the yoke in the projector lens, gap $S_4$ is smaller than gap $S_5$.

The undesirable effects of magnetic flux leakage on the electron beam passing through the two lenses is avoided in the same manner as described with reference to FIGURE 5. The magnetic flux leakage across gap $S_4$ is weak because the gap is small and the flux leakage across gap $S_5$ is symmetrical, and, therefore, has no effect upon the electron beam.

FIGURE 7 shows a magnetic flux guide for use in protecting an electron beam from the undesirable effects of magnetic flux leakage within a lens yoke. As shown in FIGURE 7, the flux guide is inserted within the aperture of the yoke of an intermediate lens 2, such as is shown in FIGURE 1. The flux guide comprises two cylinders 19a and 19b made of material having high magnetic permeability which are placed within the yoke aperture and are separated from each other by a short cylinder 20 of non-magnetic material. As shown in FIGURE 7, both cylinders have a central passageway through which an electron beam may pass. The cylinders 19a and 19b are positioned so that their axes are in line with the axis of the lens 2 and particularly with the axis of the pole piece 5.

A magnetic gap $S_6$ exists between the opposed ends of the cylinders 19a and 19b and a gap $S_7$ exists between the end surface of the cylinder 19b and the inner surface of the lower yoke 11. As shown in FIGURE 7, the lower end of the cylinder 19b is increased in diameter so as to reduce the width of the gap $S_7$.

The operation of the flux guide shown in FIGURE 7 is the same as the guides shown in the previous figures. The gap $S_6$ is symmetrical, and therefore magnetic flux leakage across this gap has no effect on an electron beam passing through the lens yoke. The gap $S_7$ is asymmetrical, but flux leakage across this gap is weak because the gap is small; therefore, there is little affect on the electron beam.

While I have described certain presently preferred embodiments of my invention, it is to be understood that they may be otherwise embodied within the scope of the appended claims.

I claim:

1. In a magnetic electron lens with an opening through which an electron beam passes subject to the adverse influence of asymmetrical magnetic flux leakage, a magnetic flux leakage guide comprising:
    (A) a body of high magnetic permeability material having a circular central opening through which the electron beam may pass, and being symmetrical about the central axis of the opening, and
    (B) nonmagnetic means for positioning the body with respect to the lens to create a gap of predetermined size between the lens and body and to maintain at least a portion of the body outside of the lens opening.

2. A magnetic flux leakage guide for controlling the paths of magnetic flux leakage in an electron beam apparatus comprising:
    (A) two cylinders of magnetic material each having a central circular opening and being symmetrical about the central axis of said opening, and
    (B) a body of nonmagnetic material between said two cylinders and secured to an end of each cylinder, said body also having a central opening,
    (C) the central axes of the openings in the two cylinders being in line.

3. Electron beam apparatus comprising:
    (A) first and second magnetic lenses having apertures through which an electron beam passes in succession, and
    (B) a magnetic flux leakage guide comprising a body of magnetic material having a central circular passageway and being symmetrical about the central axis of said passageway,
    (C) said flux leakage guide being positioned so that,
        (1) the axis of said central passageway is in line with the axis of one of said lenses,
        (2) the electron beam passes through said central passageways,
        (3) gaps are created between the body of magnetic material and said lenses wherein the gap between the body of magnetic material and the lens with which it is in alignment is wider than the gap between the body of magnetic material and the other lens.

4. Electron beam apparatus comprising:
    (A) a first magnetic lens,
    (B) a second magnetic lines positioned beneath and spaced from the first lens,
    (C) each of said lenses having an opening therein through which an electron beam may pass through the first lens and then through the second lens, and
    (D) a magnetic flux leakage guide positioned between the lenses and having
        (1) two cylinders of magnetic material each having a central opening,
        (2) a body of nonmagnetic material between said two cylinders and also having a central opening,
        (3) the central axes of the openings in the cylinders being in line,
    (E) said flux leakage guide being positioned on the second lens so that the central axes of the magnetic cylinders are in line with the central axis of the opening of the second lens and the distance between the bottom surface of the first lens and the end surface of the cylinder nearest to the first lens is less than the distance between the two cylinders.

5. Electron beam apparatus comprising:
(A) a first magnetic lens,
(B) a second magnetic lens positioned beneath and spaced from the first lens,
(C) each of said lenses having an opening therein through which an electron beam may pass through the first lens and then through the second lens, and
(D) a magnetic flux leakage guide positioned between the lenses and comprising,
 (1) a hollow cylinder of magnetic material having a lower portion extending into the opening in the second lens, a middle portion extending between the lenses and an upper portion extending into the opening in the first lens, and
 (2) a body of nonmagnetic material supporting the hollow cylinder in the opening of the second lens so that the central axis of the cylinder is in line with the central axis of the opening,
 (3) the diameters of the lens openings being such that the distance between the cylinder and the inner wall of the opening in the first lens is less than the distance between the cylinder and the inner wall of the opening in the second lens.

6. A magnetic flux leakage guide for use in a magnetic lens for electron beam apparatus, said lens having a pole piece, an exciting coil and a magnetic yoke, said pole piece and yoke having apertures through which an electron beam may pass, said flux leakage guide comprising:
(A) two hollow cylinders of magnetic material positioned in the aperture of the yoke with the central axis of the cylinders in line with the axes of the pole piece, and
(B) a body of nonmagnetic material within the yoke aperture and between the two cylinders,
(C) the outer surface of the hollow cylinder nearest the bottom of the yoke being spaced from the inner wall of the aperture of the yoke a distance less than the distance between the two hollow cylinders.

7. The method of guiding magnetic flux leakage for reducing the adverse effects of asymmetric magnetic flux leakage in magnetic electron lens on electron beams passing through the lens which comprises:
(A) providing a path of magnetic material for said flux leakage, and
(B) creating at each end of said path a gap for said flux leakage between said path of magnetic material and components of said apparatus,
(C) one of said gaps being symmetrical with respect to the path of the electron beam through the apparatus and the other gap being smaller than the symmetrical gap.

References Cited

UNITED STATES PATENTS

| | | | |
|---|---|---|---|
| 2,782,335 | 2/1957 | Ellis | 313—84 |
| 2,910,589 | 10/1959 | Van Dorsten | 250—49.5 |
| 2,455,676 | 12/1948 | Hillier | 313—84 |
| 2,687,490 | 8/1954 | Rich et al. | 313—84 |
| 2,714,678 | 8/1955 | Wolff | 313—84 |
| 3,265,925 | 8/1966 | Bodmer | 313—84 |

JAMES W. LAWRENCE, *Primary Examiner.*

V. LAFRANCHI, *Assistant Examiner.*